United States Patent [19]

Kanaan

[11] Patent Number: 5,324,050
[45] Date of Patent: Jun. 28, 1994

[54] SEALING COLLET
[75] Inventor: Roger J. Kanaan, Easley, S.C.
[73] Assignee: Jacobs Chuck Technology Corp., Wilmington, Del.
[21] Appl. No.: 68,632
[22] Filed: May 27, 1993
[51] Int. Cl.⁵ .............................. B23B 31/20
[52] U.S. Cl. ........................ 279/46.7; 279/46.9; 279/157
[58] Field of Search ........... 279/20, 43.7–43.9, 279/46.1, 46.7–46.9, 157, 49, 54–59

[56] References Cited

U.S. PATENT DOCUMENTS

| | | | |
|---|---|---|---|
| 2,346,706 | 4/1944 | Stoner | 279/46.7 |
| 2,829,899 | 4/1958 | Drew et al. | 279/46.7 |
| 2,896,954 | 7/1959 | Ernest | 279/46.9 |
| 2,909,376 | 10/1959 | Drew | 279/20 |
| 3,905,609 | 9/1975 | Sussman | 279/46.9 |
| 5,020,946 | 6/1991 | Nann | 279/46.9 |

Primary Examiner—Steven C. Bishop
Attorney, Agent, or Firm—Dority & Manning

[57] ABSTRACT

A sealing collet is provided having a plurality of independent gripping jaws longitudinally disposed about a common centerline axis. The gripping jaws have exposed inner and outer faces. A resilient material is disposed between the gripping jaws and holds the jaws in a predetermined longitudinally and angularly spaced relation about the centerline axis of a collet. A continuous outer diameter seal is disposed circumferentially about the conical outer surface of the collet. The outer diameter seal is formed integral with the resilient material. A continuous inner diameter seal is also provided disposed circumferentially within the inner diameter of the collet and also formed integral with the resilient material.

23 Claims, 2 Drawing Sheets

SEALING COLLET

BACKGROUND OF THE INVENTION

The present invention relates to machine collets, and more particularly to a sealing collet for use with tools having a through-hole for the induction of cooling fluid through the tool.

A variety of conventional drills and tools are commercially available having holes or passages defined therethrough to enable the induction of coolant to the cutting edge or working surfaces of the drill or tool. Coolant is a cutting fluid known to reduce the frictional forces acting on the drill. However, in order for a cutting fluid to function effectively, two requirements must be met. First, the fluid must have the thermal capability of removing heat generated by the tool and, secondly, the fluid must reach the cutting area or working surfaces of the tool. In order to use this conventional type of through-hole drill the collet holding the drill must be sealed to allow the coolant to flow to the cutting edge of the drill at a relatively high pressure. If the collet is not adequately sealed, the coolant will leak from around the tool holder cone and the tool holder nut and will not reach the cutting edge with adequate pressure and flow.

Conventional sealing collets are commercially available, such as the ER-COOLIT TM Collet manufactured by Engineers Tool Manufacturing Company, Limited, of Israel and sold through GTE Valenite Corporation of Troy, Mich. Another example of conventional sealing collets are the Sealing Collets sold by Rego-Fix Tool Corporation of Indianapolis, Ind. The conventional sealing collets, such as the type mentioned, relate to the commonly known split steel type collets.

Applicant, however, has determined that the conventional sealing collets are generally inadequate since they seal only at relatively low pressures and at nominal clamping diameters only. A reason for this inadequacy may be that the conventional split steel collets are made into sealing collets by adding a sealing media between the steel segments. This media is very expensive and does not hold very well to the split steel segments.

The Jacobs ® Chuck Manufacturing Company manufactures and markets a well known Rubber-Flex ® Collet of the type having a plurality of individual gripping members held in position and equally spaced about a common axis. The spaces between the gripping members is filled with an adherent resilient material, such as rubber or rubber composition. The gripping members have perforations therethrough so that the resilient material not only fills the space between the gripping members but also passes through the perforations forming a plurality of longitudinally spaced continuous angular rings which hold the gripping members in a desired relative position. Applicant has, with the present invention, configured a Rubber-Flex ® type collet as a sealing collet which has proven to be far superior to conventional sealing collets.

OBJECTS AND SUMMARY OF THE INVENTION

It is a principle object of the present invention to provide an improved sealing collet which will withstand far greater coolant fluid pressures and clamping pressures than conventional sealing collets.

Another object of the present invention is to provide a sealing collet of the type having individual gripping members molded in resilient rubber-like material.

And yet another object of the present invention is to provide a sealing collet which is relatively inexpensive to manufacture.

Additional objects and advantages of the invention will be set forth in part in the description which follows, and in part will be obvious from the description or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a sealing collet is provided for use with tools, particularly drills, having a through-hole defined therein for the induction of coolant fluid to the working surfaces or cutting edges of the tool. The collet comprises a plurality of independent gripping jaws or blades longitudinally disposed about a common centerline axis. The gripping jaws have an exposed inner face parallel to the centerline axis of the collet and define an inner diameter of the collet through which the shaft of the tool or drill is inserted. The gripping jaws have an angled exposed outer face whereby the plurality of gripping jaws forms a conical outer surface of the collet. The conical outer surface of the collet is compatible with a matching conical receiving surface of a conventional toolholder. Resilient material, such as rubber or rubber composition, is disposed between each of the gripping jaws and holds the gripping jaws in a predetermined longitudinally and angularly spaced relation about the centerline axis. A continuous outer diameter seal is disposed circumferentially about the conical outer surface of the collet. The outer diameter seal is formed integral with the resilient material. A continuous inner diameter seal is disposed circumferentially within the inner diameter of the collet and is also formed integral with the resilient material. In a preferred embodiment of the present invention, the outer diameter seal is disposed generally near the back end of the collet in relation to the collet within a toolholder and comprises a double lip seal. the extreme front end of the collet in relation to the collet within a toolholder.

In still another preferred embodiment of the present invention, the resilient material is essentially flush with the outer faces of the gripping jaws so that the outer diameter of the collet is essentially smooth. It is further preferred to define compression recesses within the resilient material between each gripping member or jaw.

In still other preferred embodiments of the invention, the sealing collet may require only one seal instead of both an inner diameter and outer diameter seal. Thus, it is within the scope of the present invention that the sealing collet contain either an inner diameter seal or an outer diameter seal.

In the preferred embodiment of the present sealing collet, the inner diameter and outer diameter seals are formed of the same resilient material disposed between the gripping jaws and are fabricated during the molding process.

The accompanying drawings, which are incorporated in and constitute a part of the specification, illustrate embodiments of the invention and, together with the description, serve to explain the principles of the invention.

BRIEF DESCRIPTION OF THE DRAWINGS

FIG. 2a is a cross-sectional view taken along the lines indicated in FIG. 1a.

DETAILED DESCRIPTION OF THE PREFERRED EMBODIMENTS

Figure 1:
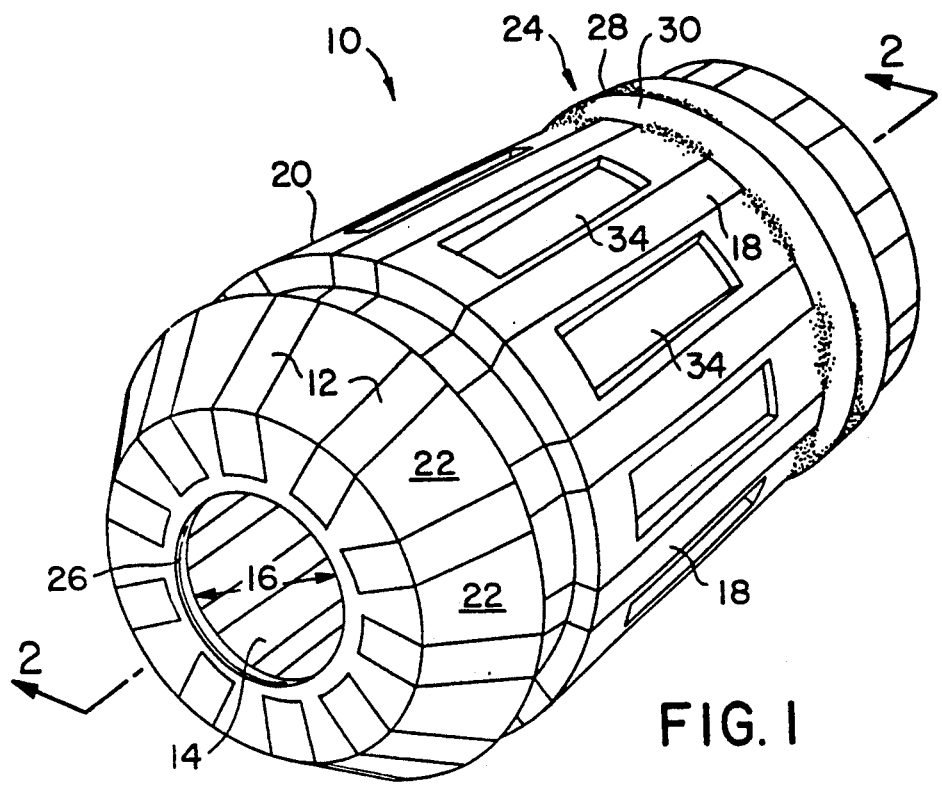
FIG. 1 is a perspective view of a collet according to the present invention and particularly illustrates the inner diameter and outer diameter seals.

Reference will now be made in detail to the presently preferred embodiments of the invention, one or more examples of which are illustrated in the accompanying drawings and figures. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used on another embodiment to yield still a further embodiment of the present invention. Thus, it is intended that the present invention cover such modifications and variations as come within the scope of the appended claims and their equivalents. Furthermore, the numbering of components in the drawings is consistent throughout the application, with the same components having the same number in each of the drawings.

Referring to FIG. 1 in particular, a sealing collet 10 is provided. Collet 10 includes resilient material 22 for holding a plurality of gripping jaws 12 in a desired spaced relation relative to each other. Preferably, resilient material 22 extends through perforations 32 within gripping jaws 12 so as to form essentially concentric rings of resilient material 22 through gripping jaws 12. Gripping jaws 12 are held by resilient material 22 in a desired longitudinally and angularly spaced relation about the longitudinal centerline axis of collet 10.

Gripping jaws 12 include an exposed inner face 14 parallel to the centerline axis of collet 10. In this manner, the plurality of inner faces 14 define the inner diameter 16 of collet 10, as indicated in FIG. 1. The shaft or shank of the through-hole drill to be held by collet 10 is inserted through inner diameter 16, as is commonly understood in the art.

Jaws 12 further include an angled exposed outer face 18 whereby the plurality of outer faces 18 define a conical outer surface 20 of collet 10. As commonly understood, conical outer surface 20 matches a complimentary conical receiving surface of a collet holder (not shown).

As depicted generally in FIG. 1, in a preferred embodiment of the invention, resilient material 22 is 10 generally flush with the outer exposed faces 18 of gripping jaws 12. However, this is not necessarily a limitation of the invention. In another embodiment of the invention, resilient material 12 may be defined generally below the exposed faces 18. Preferably, resilient material 22 also includes compression recesses 34 defined therein between each of the gripping jaws 12. Compression recesses 34 provide for compression of resilient material 22 when collet 10 is compressed within a collet holder. Compression recesses 34 may comprise a single recess defined in each interval of resilient material 22 as depicted in FIG. 1, or may comprise a series of holes, divets, or the like within resilient material 22. Applicant has determined that compression recesses 34 are particularly desired if the resilient material 22 is to be essentially flush with outer faces 18. However, compression recesses 34 are not a limitation to broader embodiments of the present invention. For example, recesses 34 may not be necessary where resilient material 22 does not extend radially outward from the centerline axis of collet 10 flush with outer surfaces 18 of the gripping jaws. Hence, it should be understood that the necessity of compression recesses 34 is dependent upon the resiliency and/or volume of resilient material between the gripping jaws.

Collet 10 further includes continuous outer diameter seal 24, as depicted in the figures. Outer seal 24 is formed integral with resilient material 22 and preferably is formed of the same material as resilient material 22. In this manner, outer seal 24 is molded integral with resilient material 22. However, it is within the scope and spirit of the present invention that outer seal 24 may comprise a material different from resilient material 22. For example, outer seal 24 may comprise an O-ring or like structure of dissimilar material which is molded into resilient material 22. However, for ease of manufacture, strength, and 10 structural integrity of collet 10, it is preferred that seal 24 be molded as an integral component of resilient material 22.

In a preferred embodiment of the invention, seal 24 comprises a double lip seal 30, as indicated in FIG. 1. In an alternative embodiment, seal 24 may comprise a single lip 28. Likewise, seal 24 may comprise a plurality of such lips. As shown in the cross-sectional view of FIG. 2, lips 28 and 30 extend radially beyond the outer faces 18 of gripping jaws 12. Seal 24 thus forms a continuous sealing ring about outer surface 20 of collet 10. It should be understood that the depiction of seal 24 in the figures is slightly exaggerated for ease of illustration. For example, applicant has determined that a sufficient height of lips 28 and 30 above outer face 18 of the jaws is generally 0.010 inches. If a double lip configuration is used, such as in FIG. 1, applicant has determined that a sufficient separation between the lips is generally 0.437 inches. It should be understood though that these measurements are in no way a limitation of the present invention. Depending upon the resiliency and thus compressibility of the material forming outer seal 24, the height of lips 28 and 30 may vary. However, it is preferred to minimize the height of lips 28 and 30 above outer faces 18 so as not to interfere with the overall interface of outer faces 18 with the receiving conical surface of an associated collet holder.

Collet 10 also preferably includes a continuous inner diameter seal 26 which is also formed integral with resilient material 22. As discussed above, it is preferred that inner diameter seal 26 also comprise a seal formed of the same material as resilient material 22 which is formed directly in the molding process of collet 10. In other words, inner seal 26 essentially forms an inner concentric ring of resilient material 22 extending radially inward beyond inner faces 14 of gripping jaws 12. Inner seal 26 may be formed essentially as an O-ring within inner diameter 16 of collet 10. In an alternative embodiment, inner seal 26 may be formed as a single lip or double lip configuration 26a, as with outer seal 24. However, for ease of manufacture, it is preferred to form seal 26 as illustrated in FIG. 1. Also, as discussed above, inner seal 26 may comprise an O-ring or like device which is molded into resilient material 22.

The arrangement of inner seal 26 and outer seal 24 in the figures with respect to the operative front and back ends of collet 10 is an example of a preferred embodiment of the invention. It should be understood though that, for example, outer seal 24 may be disposed at the extreme end of collet 10, or in the middle of collet 10. Likewise, inner seal 16 is preferably disposed at the extreme front end of collet 10 but, may be disposed virtually anywhere within inner diameter 16 of collet 10. Thus, the present invention is not limited to any particular location of the inner and outer diameter seals.

It is also within the scope and spirit of the present invention that collet 10 comprise only one of an inner diameter or an outer diameter seal. For example, if the present collet is utilized with a sealed collet nut and collet holder, under certain pressures the outer diameter seal 24 may not be necessary. In this instance, collet 10 would only comprise inner diameter seal 26. Likewise, in certain embodiments, it may be preferred not to include inner diameter seal 26, for example in a configuration wherein the collet nut is sealed around the drill shank. Thus, the present invention may only include an outer diameter seal 24.

Figure 2:
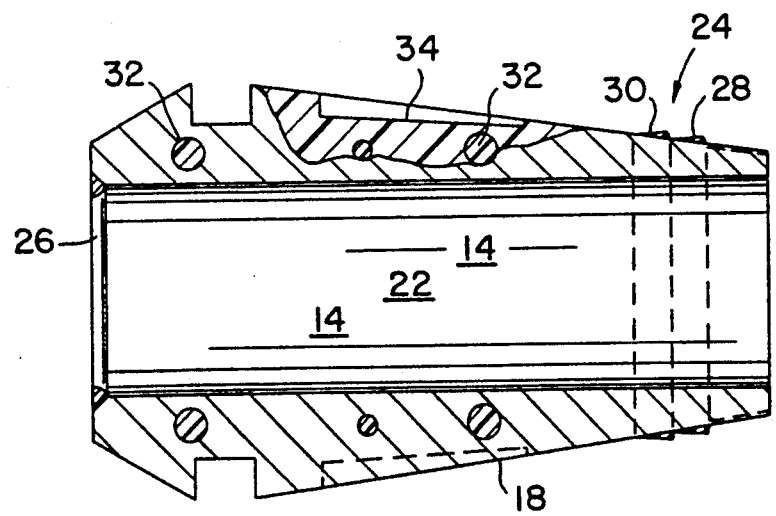
FIG. 2 is a cross-sectional view of the present collet taken along the lines indicated in FIG. 1.
Figure 1A:
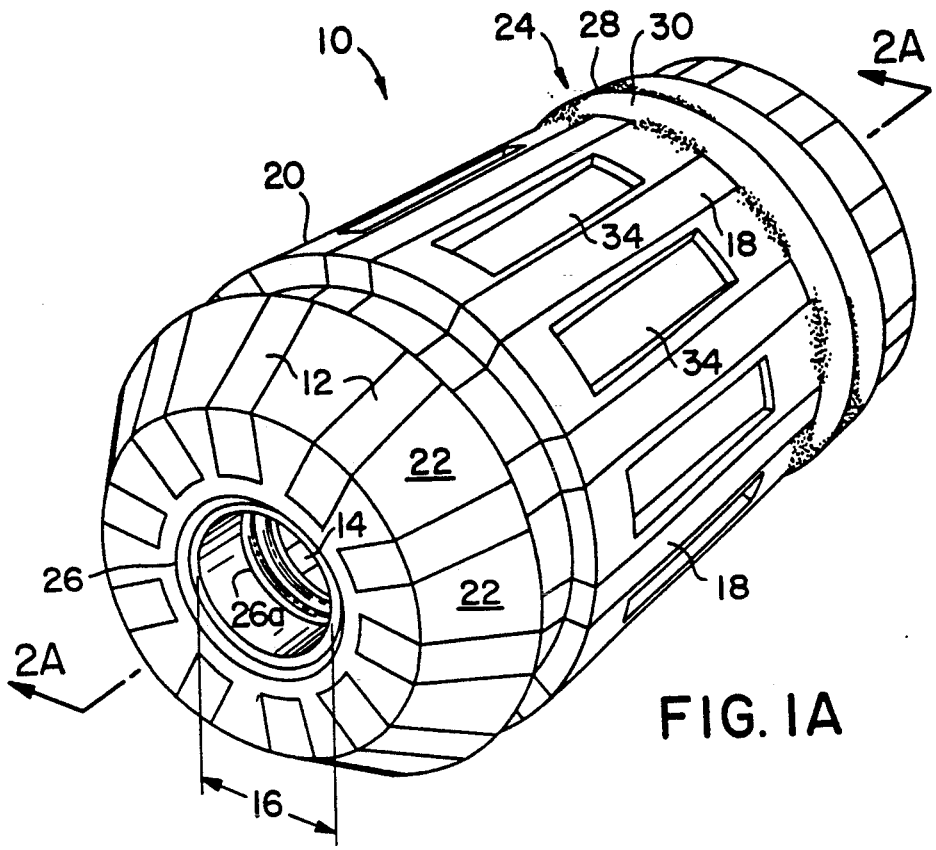
FIG. 1a is a perspective view of the present collet with a double lip inner seal.
Figure 2A:
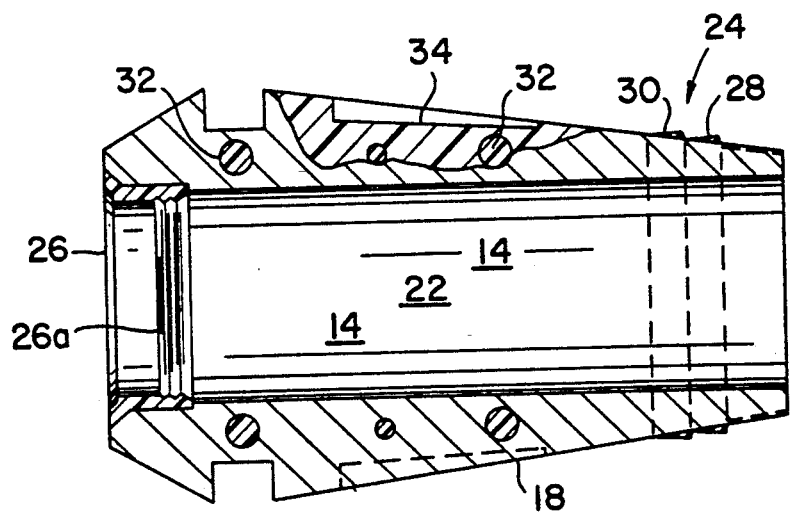

The shape of lips 28, 30 of outer diameter seal 24 depicted in FIG. 2 is an illustration of a preferred shape of the seals. However, it is within the scope of the invention to form lips 28 and 30 as a generally circular bead or ring, or other shape. The only requirement is that lips 28 and 30 extend radially beyond outer faces 18 of the gripping jaws so that when collet 10 is tightened within the collet holder, the lips compress and form a continuous sealing ring about the outer diameter surface of the collet. Likewise, as the gripping jaws are uniformly compressed radially inward, inner seal 26 compresses against the tool shank forming a continuous sealing ring therearound.

It is intended that the appended claims and their equivalents cover the various modifications and variations which can be made in the apparatus of the present invention.

What is claimed is:

1. A sealing collet for use with tools having through holes defined therein for the induction of coolant fluid to the working surfaces of the tool, said collet comprising:
   a plurality of independent gripping jaws longitudinally disposed about a common centerline axis, said gripping jaws having an inner gripping face parallel to the centerline axis and defining an inner diameter for said collet through which the shaft of a machine tool is inserted, said gripping jaws having an outer face whereby said plurality of gripping jaws forms an outer surface of said collet;
   resilient material disposed between each said gripping jaw, said resilient material holding said gripping jaws in a predetermined longitudinally and angularly spaced relation about the centerline axis;
   a continuous outer diameter seal disposed circumferentially about said outer surface, said outer diameter seal formed integral with said resilient material and extending circumferentially radially outward beyond said outer faces of said gripping jaws; and
   a continuous inner diameter seal disposed circumferentially within said inner diameter structurally independent of said outer diameter seal, said inner diameter seal formed integral with said resilient material and extending circumferentially radially inward from said inner faces of said gripping jaws.

2. The collet as in claim 1, wherein said outer diameter seal is disposed generally near the back end of said collet in relation to said collet within a tool holder.

3. The collet as in claim 1, wherein said inner diameter seal is disposed generally at the front end of said collet in relation to said collet within a tool holder.

4. The collet as in claim 1, wherein said outer diameter seal comprises a single-lip seal.

5. The collet as in claim 1, wherein said outer diameter seal comprises a double-lip seal.

6. The collet as in claim 1, further comprising at least one additional said inner diameter seal.

7. The collet as in claim 1, wherein each said gripping jaw further comprises at least one said perforation defined therethrough, said resilient material extending through said perforations so as to form essentially concentric rings of resilient material through said gripping jaws.

8. The collet as in claim 1, wherein said outer diameter seal and said inner diameter seal are molded integral with said resilient material.

9. The collet as in claim 7, wherein said outer diameter seal and said inner diameter seal are formed of said resilient material.

10. A sealing collet for use with tools having through holes defined therein for the induction of coolant fluid to the working surfaces of the tool, said collet comprising:
    a plurality of independent gripping jaws longitudinally disposed about a common centerline axis, said gripping jaws having an exposed inner face parallel to the centerline axis and defining an inner diameter for said collet through which the shaft of a machine tool is inserted, said gripping jaws having an angled exposed outer face whereby said plurality of gripping jaws forms a conical outer surface of said collet, each said gripping jaw having at least one hole defined therein whereby all of said holes are circumferentially aligned about said centerline axis;
    a resilient material disposed between said gripping jaws and extending through said holes to form at least one concentric ring through said gripping jaws, said resilient material maintaining said gripping jaws in a predetermined longitudinally and angularly spaced relation about said centerline axis;
    a resilient material outer diameter seal formed integral with said resilient material, said outer diameter seal extending radially outward from said resilient material beyond and across said outer faces of said gripping jaws; and
    a resilient material inner diameter seal formed integral with said resilient material and physically separate from said outer diameter seal, said inner diameter seal extending radially inward from said resilient material beyond and across said inner diameter faces of said gripping jaws.

11. The collet as in claim 10, wherein said outer diameter seal and said inner diameter seal form essentially continuous seals about said outer diameter faces and said inner diameter faces respectively of said gripping jaws.

12. The collet as in claim 10, wherein said outer diameter seal comprises a double-lip seal.

13. The collet as in claim 10, further comprising a plurality of said inner diameter seals.

14. The collet as in claim 10, wherein said resilient material is essentially flush with said exposed outer faces of said gripping jaws.

15. A sealing collet for use with tools having through holes defined therein for the induction of coolant fluid therethrough to the working surfaces of the tool, said collet comprising:
- a plurality of independent gripping jaws longitudinally disposed about a common centerline axis, said gripping jaws having an exposed inner face parallel to the centerline axis and defining an inner diameter for said collet through which the shaft of a machine tool is inserted, said gripping jaws having an angled exposed outer face whereby said plurality of gripping jaws forms a conical outer surface of said collet, each said gripping jaw having at least one hole defined therein whereby all of said holes are circumferentially aligned about said centerline axis;
- a resilient material disposed between said gripping jaws and extending through said holes to form at least one concentric ring through said gripping jaws, said resilient material maintaining said gripping jaws in a predetermined longitudinally and angularly spaced relation about said centerline axis; and
- a continuous outer diameter seal formed integral with said resilient material, said outer diameter seal extending radially outward from said resilient material beyond said outer faces of said gripping jaws.

16. The seal as in claim 15, further comprising a continuous inner diameter seal formed integral with said resilient material, said inner diameter seal extending radially inward from said resilient material beyond said inner diameter faces of said gripping jaws.

17. A sealing collet for use with tools having through holes defined therein for the induction of coolant fluid therethrough to the working surfaces of the tool, said collet comprising:
- a plurality of independent gripping jaws longitudinally disposed about a common centerline axis, said gripping jaws having an exposed inner face parallel to the centerline axis and defining an inner diameter for said collet through which the shaft of a machine tool is inserted, said gripping jaws having an angled exposed outer face whereby said plurality of gripping jaws forms a conical outer surface of said collet, each said gripping jaw having at least one hole defined therein whereby all of said holes are circumferentially aligned about said centerline axis;
- a resilient material disposed between said gripping jaws and extending through said holes to form at least one concentric ring through said gripping jaws, said resilient material maintaining said gripping jaws in a predetermined longitudinally and angularly spaced relation about said centerline axis; and
- a continuous inner diameter seal formed integral with said resilient material, said inner diameter seal extending radially inward from said resilient material beyond said inner diameter faces of said gripping jaws.

18. The seal as in claim 17, further comprising a continuous outer diameter seal formed integral with said resilient material, said outer diameter seal extending radially outward from said resilient material beyond said outer faces of said gripping jaws.

19. A sealing collet for use with tools having through holes defined therein for the induction of coolant fluid to the working surfaces of the tool, said collet comprising:
- a plurality of independent gripping jaws longitudinally disposed about a common centerline axis, said gripping jaws having an inner face parallel to the centerline axis and defining an inner diameter for said collet through which the shaft of a machine tool is inserted, said gripping jaws having an outer face whereby said plurality of gripping jaws forms a conical outer surface of said collet, each said gripping jaw having at least one hole defined therein whereby all of said holes are circumferentially aligned about said centerline axis;
- a resilient material disposed between said gripping jaws and extending through said holes to form at least one concentric ring through said gripping jaws, said resilient material maintaining said gripping jaws in a predetermined longitudinally and angularly spaced relation about said centerline axis, said resilient material being essentially flush with said outer faces of said gripping jaws;
- a resilient material outer diameter seal formed integral with said resilient material, said outer diameter seal extending radially outward from said resilient material beyond and across said outer faces of said gripping jaws;
- a resilient material inner diameter seal formed integral with said resilient material, said inner diameter seal extending radially inward from said resilient material beyond and across said inner diameter faces of said gripping jaws; and
- compression recesses defined in said resilient material between each said gripping jaw.

20. A sealing collet for use with tools having through holes defined therein for the induction of coolant fluid to the working surfaces of the tool, said collet comprising:
- a plurality of independent gripping jaws longitudinally disposed about a common centerline axis, said gripping jaws having an inner gripping face parallel to the centerline axis and defining an inner diameter for said collet through which the shaft of a machine tool is inserted, said gripping jaws having an outer face whereby said plurality of gripping jaws defines an outer surface of said collet;
- resilient material disposed between each said gripping jaw, said resilient material holding said gripping jaws in a predetermined longitudinally and angularly spaced relation about the centerline axis;
- a continuous outer diameter seal disposed circumferentially about said outer surface, said outer diameter seal formed integral with said resilient material and extending circumferentially radially outward beyond said outer faces of said gripping jaws; and
- a continuous inner diameter seal disposed circumferentially within said inner diameter independent of and axially displaced from said outer diameter seal, said inner diameter seal formed integral with said resilient material and extending circumferentially radially inward from said inner faces of said gripping jaws, said inner diameter seal comprising a double-lip seal configuration.

21. The collet as in claim 20, wherein said double-lip inner diameter seal is disposed at a distance within said inner diameter from the front end of said collet.

22. The collet as in claim 21, further comprising an additional inner diameter seal disposed within said inner diameter generally at the extreme front end of said collet.

23. The collet as in claim 22, wherein said additional inner diameter seal comprises a single-lip seal configuration.

* * * * *